United States Patent
Turner et al.

[15] 3,656,211
[45] Apr. 18, 1972

[54] RECIPROCABLY LATCHED CANOPY RELEASE

[72] Inventors: James W. Turner; Ray E. Spinks, both of El Centro, Calif.

[73] Assignee: The United States of America as represented by the Secretary of the Navy

[22] Filed: Apr. 28, 1970

[21] Appl. No.: 32,674

[52] U.S. Cl............................24/230, 24/194, 24/206
[51] Int. Cl. ....................................................A44b 19/00
[58] Field of Search...................24/230, 181, 190, 194, 206

[56] References Cited

UNITED STATES PATENTS

| | | | |
|---|---|---|---|
| 3,330,014 | 7/1967 | Gaylord | 24/230 |
| 3,277,548 | 10/1966 | Fisher | 24/230 |
| 3,066,375 | 12/1962 | Knowles et al | 24/230 |
| 3,522,640 | 8/1970 | Lohr | 24/230 |

Primary Examiner—Bobby R. Gay
Assistant Examiner—Garry Moore
Attorney—R. S. Sciascia, George J. Rubens and John W. McLaren

[57] ABSTRACT

A parachute canopy release having a female fitting and a male fitting having prongs to be positively latched within the female fitting, the latching means being preformed by a reciprocable latch bar to minimize inadvertent separation, the latch bar being cam operated by an actuating lever in a direction normal to a plane containing the prongs to release the prongs and allow the fittings to be separated.

9 Claims, 8 Drawing Figures

PATENTED APR 18 1972

INVENTORS
JAMES W. TURNER
BY RAY E. SPINKS

*George J. Rubens*
ATTORNEYS

RECIPROCABLY LATCHED CANOPY RELEASE

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

The invention relates to a quick-release type connector particularly suitable for parachutes, and more particularly to such a release having a positive latching means that will afford a greater load bearing area and prevent premature separation.

One of the canopy releases presently in use with official U.S. Navy parachutes is manufactured by the H. Koch and Sons under U.S. Pat. No. 3,183,568. In this patented release the V-shaped notched ends of the prongs of the male fittings are detachably locked within the female fitting by a crescent-shaped shaft rotatably mounted within the female fitting and operated by an actuating lever. The rotatable locking shaft is biased to the locking position by two torque springs which are the only provision for maintaining the rotatable shaft in the locked condition. With the actuating lever in the locked position and in order to provide a "snap-in" connection for the male prongs, a certain amount of slack is provided in the rotatable movement of the locking shaft which is controlled only by the torque springs.

Exhaustive environmental tests have disclosed that this freedom of rotation in the shaft exists even though the actuating lever is in a locked position which play allows the shaft to rotate accidentally to an open position when the release is subject to shock, strain, vibrations and various other stresses encountered under normal canopy opening conditions.

SUMMARY OF THE INVENTION

An improved locking mechanism is provided for a parachute canopy release so that the male and female fittings are positively locked together in a manner to eliminate accidental separation caused by vibration, etc. Instead of employing a rotatable shaft as does the prior art patent as the locking element with the male prongs which inherently requires a slack condition in the connection, a novel reciprocable locking bar is used that transversely engages the male prongs. With its actuating lever in a locked position, the locking bar is spring-loaded to the latching position. The locking bar can be momentarily cammed out of the latching position by the insertion of the male prongs. When the prongs are fully inserted, the locking bar is snapped back into locking engagement with the prongs by the action of the latching spring. It is important that this engagement be accomplished independent of and without the need for moving the actuating lever from its locked position.

This unique locking action in which the locking bar is reciprocable in a direction normal to the direction of pull on male prongs provides a positive latching action therewith and an increased load-bearing retention area.

STATEMENT OF THE OBJECTS OF THE INVENTION

A principal object of this invention is to provide a canopy release having a more positive latching action that will minimize inadvertent separation by vibration and the like.

Another important object is to provide an improved canopy release that can be accomplished by refurbishing existing releases in stock.

Still a further important object is to provide a canopy release in which there is no direct connection between the locking bar and its actuating lever.

Other objects and many of the attendant advantages of this invention will be readily appreciated as the same becomes better understood by reference to the following detailed description when considered in connection with the accompanying drawings wherein:

DESCRIPTION OF THE PREFERRED EMBODIMENT

Figure 1:
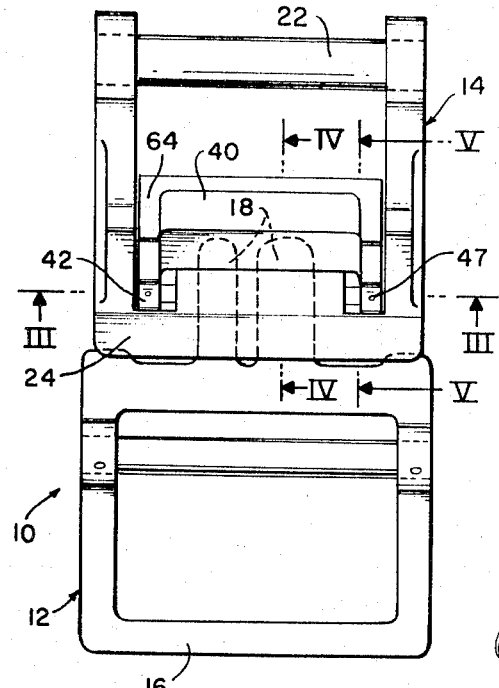
FIG. 1 is a top plan view of the novel canopy release with the male and female fittings being connected.
Figure 2:
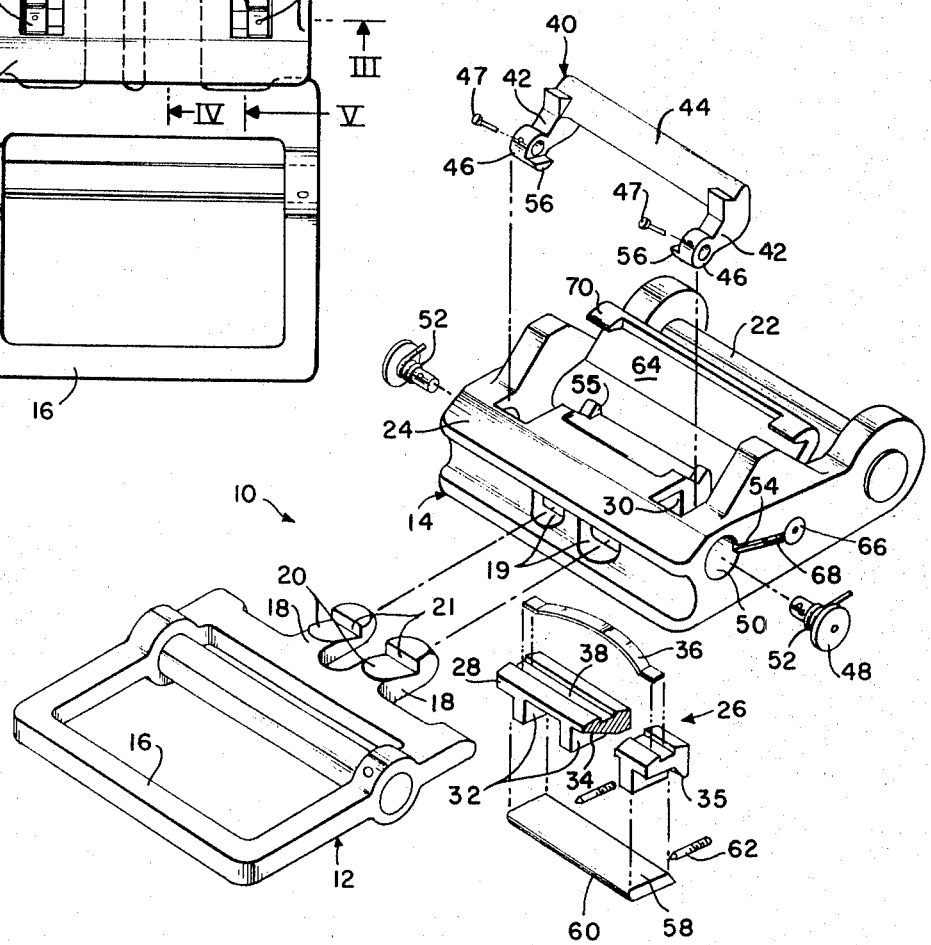
FIG. 2 is an exploted isometric view of a canopy release with the male and female fittings in a separated relationship.
Figure 3:
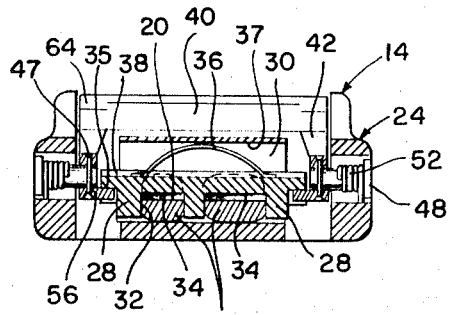
FIG. 3 is a transverse section through the canopy release taken along line III—III of FIG. 1.

Referring to the drawings where like reference numerals refer to similar parts throughout the figures there is shown in FIG. 1 a top plan view an assembled canopy release 10 comprising a male fitting 12 and a female fitting 14. As best illustrated in FIG. 2, male fitting 12 has at an outer end a bail 16 adapted to be looped by a harness strap or the like (not shown), and at the inner end a pair of longitudinally extending prongs 18 adapted to be received by female fitting 14. It should be noted that one prong is larger in width than the other to ensure that the prongs can be received by corresponding pockets 19 in the female fitting only in a predetermined relation, i.e., with the notches 20 on the prongs facing upwardly. Notches 20 have a vertical bearing portion 21, and the free ends of prongs 18 are rounded to provide a camming action when the fittings are connected, later to be described.

Female fitting 14 has at its outer end a rotatable pin 22 to be looped by the other end of the harness strap or the like, not shown, and at the inner end an integral inverted U-shaped frame 24 for housing the latching mechanism generally indicated at 26. A locking bar 28 is slidable mounted within a vertical channel 30 in frame 24 which slot is normal to an intersects pockets 19 as clearly shown in FIGS. 4–7 inclusive. Locking bar 28 is provided with a pair of centrally positioned channels 32 aligned with slots 19 in the frame, channels 32 each having a sloping bearing surface 34 positioned in the path of each prong 18. Locking bar 28 is also provided with a cam surface 35, one at each end to assist in lifting the locking bar as will be explained shortly.

Figure 5:
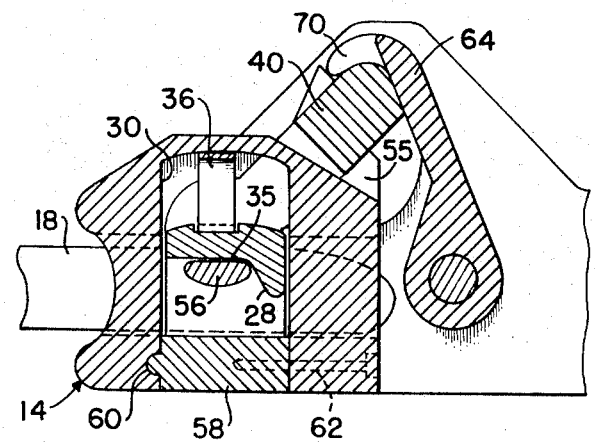
FIG. 5 is a longitudinal section taken along line V—V of FIG. 1 showing the relationship between the actuating lever cam and the locking bar cam surface in the latched position of the release as in FIG. 4.
Figure 7:
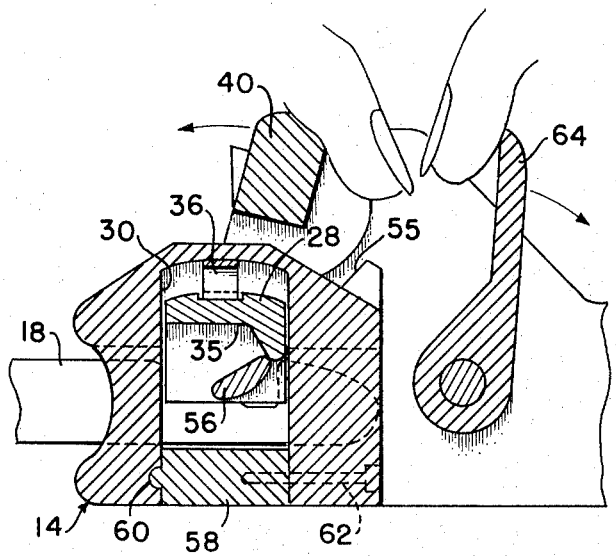
FIG. 7 is a similar view as FIG. 5 showing the locking lever being held in an unlocked position by the fingers of the right hand of the user and the actuating lever rotated and held in an unlatching position by the fingers on the left hand to compress the latching spring and permit the fittings to be separated.

When the fittings are initially connected the rounded upper edge of prongs 18 engage bearing surfaces 34 forcing locking bar 28 upwardly against the action of locking spring 36 until the end of the surface 34 snap-fits into prong notches 20 to lock the fittings together. It should be noted that bearing surfaces 34 and prong notches 20 are complimentary providing a substantial area of bearing surface 21 normal to the direction of pull on the release fittings. Spring 36 may be a leaf spring, coil spring or the like positioned between the top wall 37 of channel 30 and the top of locking bar 28 and fitting into a groove 38 in the latter. Spring 36 is always under compression and biases the locking bar to a locking position. Locking bar 28 is elevated to a release position within channel 30 through a camming action instituted by an actuating lever 40 which is best illustrated in FIG. 2. Actuating lever 40 comprises a pair of end lever arms 42 connected by a crosspiece 44. Each lever arm 42 terminates in a hub portion 46 (FIG. 2) pinned at 47 to a pair of stub shaft 48 journelled in drilled openings 50 in the frame. Each stub shaft is provided with a torque spring 52 having one end anchored in its respective pin and another free end seatable in one end of a slot 54, one on each side of the side of female fitting 14. Torque springs 52 serve to bias actuating lever 40 to the locked position (clockwise) in which position locking bar is biased by spring 36 to a locking position with reference to the male prongs and where crosspiece 44 engages integral stops 55 on frame 24 (FIG. 5). Actuating lever hubs 46 each have an integral, inwardly projecting cam 56, which when assembled in the female fitting are positioned directly below and in engagement with cam surfaces 35 at the ends of the locking bar. Leaf spring 36 maintains cam surfaces 35 in engagement with cam 56, as shown in FIGS. 5 and 7, which limits downward movement of locking bar 28. In addition, the bottom open end of vertical channel 30 in the female fitting is closed by a bottom plate 58 having a tongue and groove connection 60 at one side with the bottom frame 24 and locked in position at the opposite side by a pair of screws 62, as best shown in FIG. 2.

Figure 8:
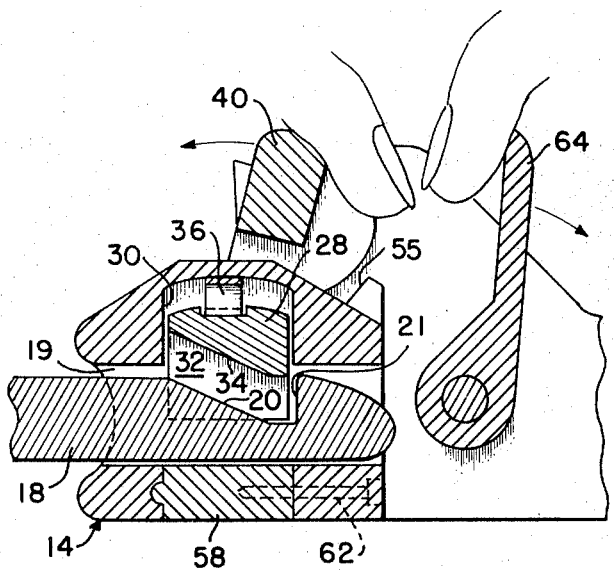
FIG. 8 is a similar view as FIG. 7 except taken along line IV—IV of FIG. 1 showing how the locking bar releases the male prongs by intentional movement of the actuating lever by the user.

As shown in FIG. 7, locking bar 28 can be intentionally lifted to an unlocked position by the parachutist fingers engaging actuating lever 40 and rotating it counterclockwise as shown by the arrow against the action of torque springs 52, which causes cams 56 to rotate and bear against the sloping cam surfaces 35 to force locking bar 28 upwardly against the action of leaf spring 36. As shown in FIG. 8, in the elevated position, bearing surfaces 34 disengage the male prong notches 20 to permit the prongs to be withdrawn from the female fitting.

Figure 4:
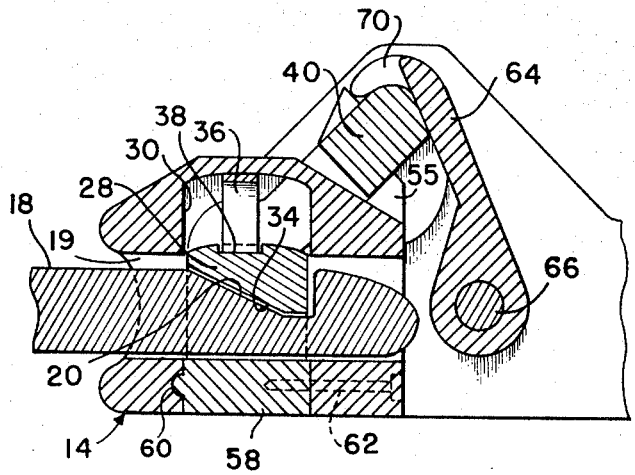
FIG. 4 is a partial longitudinal section of the canopy release taken along line IV—Iv of FIG. 1 showing the male and female fittings in latched position.
Figure 6:
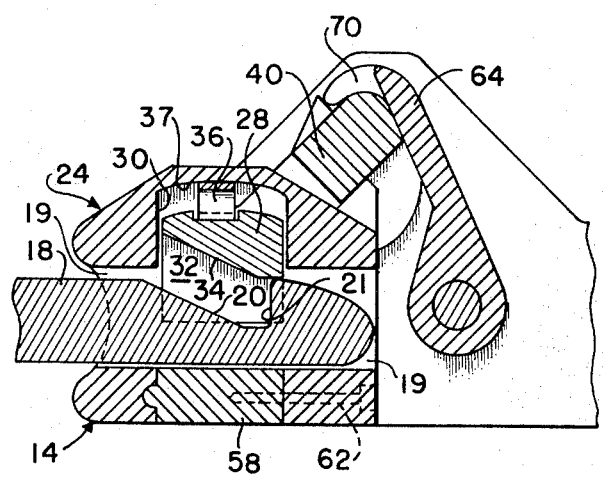
FIG. 6 is a longitudinal section of the canopy release immediately prior to the snap-fitting locking position in FIG. 4 showing the compression of the latching spring by entry of the prongs.

In order to permit rotation of actuating lever 40, it is first necessary to release locking lever 64. Locking lever 64 is hinged by stub shafts 66 to the sides of female fitting 14 and is spring biased to a locking position, i.e., counter-clockwise, as shown in FIGS. 4-6 by a pair of torque springs 68, similar to springs 52 (FIG. 2). Locking lever 64 has a pair of lip extensions 70 which are adapted to fit over and engage the top of actuating lever 40 to prevent its unintentional operation. It should be noted that locking lever 64 is hinged in the female fitting at a point offset to position the levers at about 90° relationship and to provide sufficient access to actuating lever 40 by the fingers of one hand of the parachutist as the locking lever is held in its open position (i.e., rotated clockwise) by the fingers of the other hand of the parachutist (see FIG. 7).

OPERATION

In the separated condition of the male and female fittings 12 and 14, respectively, of the release, locking bar 28 is biased by spring 36 to a downward latching position and locking lever 64 is engaging actuating lever 40 to maintain it in a latching position. To connect the fittings, the male prongs need only be pushed into slots 19 of female fitting in a properly oriented position (FIG. 6). The rounded ends of the prongs engage bearing surfaces 34 to force locking bar 28 upwardly compressing leaf spring 36 until prong notches 20 are vertically aligned with bearing surface 34 at which time locking bar 28 is snap-fitted into locking engagement with the prongs under the action of spring 36 (FIG. 4). As can be seen in FIG. 4, a maximum area of bearing surface is provided between the latched parts that prevents accidental separation. It has been calculated that it would take about 400 G's force to raise the locking bar to release the prongs accidentally.

To separate the connected fittings, the male and female fittings are grasped by the user and the locking lever 64 is first rotated by the fingers of one hand in a clockwise direction (see arrow) to unlatch actuating lever 40 which is now free to be rotated counterclockwise by the fingers of the other hand. Rotation of actuating lever 40 forces cams 56 against cam surfaces 35 to lift locking bar from the latched position shown in FIG. 5 to the unlocked position shown in FIG. 8 at which position bearing surfaces 34 are free of and release notches 20 in the prongs to enable the fittings to be separated by simply pulling apart by the user.

First releasing actuating lever 40 enables the lever to be spring loaded by torque springs 52 to the clockwise position, freeing locking bar 28 to be loaded by leaf spring 36 to the latching position ready for entry of the male prongs when next to be connected. The locking lever 64 can then be released and under action of torque springs 68 be returned to locking engagement with the top of actuating lever 40 (FIGS. 4-6).

Obviously many modifications and variations of the present invention are possible in the light of the above teachings. It is therefore to be understood that within the scope of the appended claims the invention may be practiced otherwise than as specifically described.

What is claimed is:

1. A release connector comprising:
   a male fitting having at least one prong extending therefrom;
   a female fitting having a pocket to receive said prong;
   said female fitting having a channel intersecting said pocket perpendicular thereto;
   a locking bar reciprocably movable within said channel in a plane substantially normal to said prong;
   a locking bar and said prong having complimentary bearing surfaces for latching connection;
   means for biasing said locking bar to a latching position; and
   actuating means for moving reciprocably said locking bar to an unlatched position against the action of said biasing means to disconnect said bearing surfaces and permit separation of said fittings.

2. The connector of claim 1 wherein said biasing means comprises a spring positioned between the locking bar and the end of said channel.

3. The connector of claim 1 wherein said actuating means is provided with a cam adapted to engage a cam surface on the side of the bar opposite to the biasing means whereby the locking bar may be raised against the action of the biasing means to separate said bearing surfaces.

4. The connector of claim 3 wherein a pair of cam surfaces are located at both ends of said locking bar and the actuating means is provided with a pair of corresponding cams for engagement therewith.

5. The connector of claim 1 wherein said actuating means and said locking bar are movable independently of the other.

6. The connector of claim 3 wherein said actuating means is a pair of interconnected levers having cams, and said locking bar is provided with a centrally locate bearing surface for camming engagement with the end of the male prong, said locking bar also provided with a cam surfaces at each end thereof for engagement with the actuating lever cams.

7. The connector of claim 1 wherein said bearing surfaces each have at least a portion extending normal to the direction of pull on said release fittings.

8. A locking bar for use in a release connector having a male and a female fitting comprising:
   a member having a plurality of intermediately located legs spaced apart extending normal thereto to form at least one channel therebetween to receive a prong of the male fitting;
   a bearing surface formed in the channel on the underside of said member adapted to be engaged by the male prong;
   a pair of cam surfaces formed on the underside of said member at the outer ends thereof for engagement by an actuating lever.

9. A release connector comprising:
   a male fitting having at least one prong extending longitudinally therefrom;
   a female fitting having a pocket therein to receive said prong;
   said female fitting having a channel intersecting the pocket perpendicular thereto;
   a locking bar reciprocable movable within said channel in a plane substantially normal to the prong;

said locking bar and said prongs have complimentary bearing surfaces for a latching connection, portions of said bearing surfaces being substantially normal to the direction of pull;

a first spring means positioned between the end of the channel and said locking bar for loading the latter to a latching engagement with the prongs;

an actuating lever having a pair of cams adapted to engage a pair of cam surfaces on the side of the locking bar opposite to the first spring means for moving said locking bar to an unlatched position against the action of said first spring;

a second torque spring means for biasing said actuating lever to permit said locking bar to assume a latching position; and said locking bar and said actuating lever being movable independently of the other.

* * * * *